United States Patent
Gokuraku et al.

(10) Patent No.: US 6,432,525 B1
(45) Date of Patent: Aug. 13, 2002

(54) BLOW-MOLDED FOAM AND PROCESS FOR PRODUCING THE SAME

(75) Inventors: Hiroyuki Gokuraku, Imaichi; Naochika Kogure; Takashi Kitahama, both of Utsunomiya, all of (JP)

(73) Assignee: JSP Corporation, Tokyo (JP)

( * ) Notice: Subject to any disclaimer, the term of this patent is extended or adjusted under 35 U.S.C. 154(b) by 0 days.

(21) Appl. No.: 09/554,514

(22) PCT Filed: Nov. 27, 1998

(86) PCT No.: PCT/JP98/05361

§ 371 (c)(1),
(2), (4) Date: May 17, 2000

(87) PCT Pub. No.: WO99/28111

PCT Pub. Date: Jun. 10, 1999

(30) Foreign Application Priority Data

Nov. 28, 1997 (JP) .............................. 9-343829

(51) Int. Cl.⁷ ................................ B32B 3/00

(52) U.S. Cl. ............................... 428/318.6; 428/318.4; 428/319.3; 428/319.7; 428/316.6

(58) Field of Search .......................... 428/318.4, 318.6, 428/319.3, 319.7, 316.6

(56) References Cited

U.S. PATENT DOCUMENTS

| | | |
|---|---|---|
| 4,511,955 A | 4/1985 | Ernst et al. |
| 4,874,649 A | 10/1989 | Daubenbuchel et al. |
| 4,915,934 A | 4/1990 | Tomlinson |
| 5,366,674 A | 11/1994 | Hattori et al. |
| 5,819,991 A | 10/1998 | Kohn et al. |

FOREIGN PATENT DOCUMENTS

| | | |
|---|---|---|
| WO | 9611216 | 4/1996 |
| WO | 9619384 | 6/1996 |
| WO | 9853986 | 12/1998 |
| WO | 9932544 | 7/1999 |

OTHER PUBLICATIONS

Derwent Abstract JP 92079819 (Toyota Shatai KK), Dec. 17, 1992.*
Derwent Abstract JP 4147832 (Hoechst AG), Mar. 10, 1999.*
Derwent Abstract JP 6107038 (Showa Denko KK), Apr. 19, 1994.*
Derwent Abstract JP 6285964 (Showa Denko KK), Oct. 11, 1994.*
Derwent Abstract JP 6335955 (Japan Steel Works Ltd.), Dec. 6, 1994.*
Derwent Abstract JP 55116549 (Kyoraku Co., Ltd.), Sep. 8, 1980.*
Derwent Abstract JP 55156032 (Sekisui Plastics Co., Ltd.), Dec. 4, 1980.*
Derwent Abstract JP 58124637 (Nippon Plastics KK), Jul. 25, 1983.*

(List continued on next page.)

Primary Examiner—Blaine Copenheaver
Assistant Examiner—Leanna Roché
(74) Attorney, Agent, or Firm—Sherman & Shalloway

(57) ABSTRACT

In the present invention, for the production of a blow-molded foam, there is used a base resin which is mainly composed of a polypropylene resin and has, at 230° C., a melt tension (MT) of 10 gf or over and a melt flow rate (MFR) of 0.5 g/10 minutes or over. A foaming agent is added to the base resin, followed by melt kneading by means of an extruder under high temperature and high pressure conditions to provide a foamable melt. This melt is subjected to extrusion from a circular die 5 and expanded to form a cylindrical foamed parison 4. Thereafter, molds 6, 6 are clamped, and the parison 4 in a softened condition is placed in the molds 6, 6, and a pressurized gas is blown into the parison 4 from a gas blowing port 7 for blow molding in the form of a hollow shape conforming to the mold profile to produce a blow-molded foam.

8 Claims, 5 Drawing Sheets

OTHER PUBLICATIONS

Derwent Abstract JP 56044632 (Sekisui Plastics Co., Ltd.), Apr. 23, 1981.*
Derwent Abstract JP 83010217 (Electro Chem. Ind. KK), Feb. 24, 1983.*
Derwent Abstract JP 3–59819 (Ekuseru K.K.), Sep. 11, 1991.
Derwent Abstract JP 6–312449 (Showa Denko K.K.), Nov. 8, 1994.
Derwent Abstract JP 63–236620 (Krupp Kautex Machinenbau GmbH).
Derwent Abstract JP 57–197132 (Sumitomo Chemical Co., Ltd.) Dec. 3, 1982.
Derwent Abstract JP 7–2391 (Tigers Polymer Corp.), Jan 18, 1995.
Derwent Abstract JP 6–322167 (Sekisui Chemical Co., Ltd.), Nov. 22, 1994.
Database WPI, Section Ch, Week 199445, Derwent Publications Ltd., XP002151771 (abstract of JP 1993–0075876).
Database Rapra Abstracts, XP 002151769 an abstract of Modern Plastics International, 20, No. 2, Feb. 1990, pp. 12–13, from Hoechst AG.
Database Rapra Abstracts, XP 002151770 an abstract of British Plastics and Rubbert, Oct. 1997, p. 45, from Krupp Kautex Maschinenbau.

* cited by examiner

BLOW-MOLDED FOAM AND PROCESS FOR PRODUCING THE SAME

CROSS-REFERENCE TO RELATED APPLICATION

This application is the National Phase entry, 35 USC 371, of International PCT application, PCT/JP98/05361, filed Nov. 27, 1998, and designating the United States.

TECHNICAL FIELD

This invention relates to a blow-molded foam having a high expansion ratio and a large wall thickness and also to a process for producing the same.

BACKGROUND ART

It has been hitherto performed to obtain hollow blow-molded foams having a foamed layer by use of blow molding. As a process of obtaining blow-molded foams, there have been proposed a number of processes, of which there has been frequently used a process, which comprises melt kneading a foaming agent and a base resin by means of an extruder, placing a cylindrical foamed parison, which has been formed by extrusion of the melt from a die, in a mold, and subjecting the parison to blow molding wherein a pressurized gas is blown into the parison.

Such blow-molded foams have utility in the fields which require heat insulation properties, soundproof properties, flexibility and the like, particularly, in the fields of ducts, automotive parts, containers and the like. In these applications, there have been favorably employed foams whose expansion ratio is at 3~30. For instance, in Japanese Patent Publication No. Hei 3-59819, there is disclosed a blow-molded foam whose foamed layer is made of polystyrene or polyethylene as a base resin and has an expansion ratio in the range of 4~12. Taking the heat resistance, rigidity and the like of the molded foam into account, it is preferred to use a polypropylene resin as a base resin.

However, when an attempt has been made to obtain a blow-molded foam while using a polypropylene resin as a base resin, there could not have been obtained, according to prior art techniques, blow-molded foams having a favorable expansion ratio of 3~30 and a thickness of not smaller than 0.5 mm. For instance, in Japanese Laid-open Patent Application No. Hei 8-72127 wherein an attempt is made to obtain products of a high expansion ratio, the expansion ratio of the resultant blow-molded foam is, at most, as low as 3, with a difficulty being involved in obtaining a foam having a higher expansion ratio. Moreover, the thickness of the, foamed layer of the blow-molded foam is no more than approximately 0.3 mm, and it has been difficult to obtain a product having a larger thickness.

The reason why it is not possible to obtain a blow-molded foam having an expansion ratio of 3 or over and a thickness of 0.5 mm or over in case where a polypropylene resin is used as a base resin is considered as follows.

When a molten mixture of a base resin and a foaming agent is extruded from the die of an extruder toward the low pressure zone, the foaming agent mixed with the base resin is expanded, thereby causing foaming, whereupon when the temperature of the base resin is high, the viscosity and melt tension so lower as not to keep the foaming agent to be held in the base resin. This entails dissipation of the foaming agent from the base resin matrix at the time of extrusion foaming, thereby forming an open-cell foamed parison, or in the worst case, making the foaming impossible. In contrast,e if the temperature of the base resin is lowered in order to keep the viscosity and melt tension of the base resin at high levels, the crystallization of the base resin proceeds, disabling the satisfactory and uniform expansion.

Accordingly, the extrusion foaming has to be performed at a temperature at which satisfactory and uniform expansion proceeds and the base resin exhibits viscoelasticity sufficient to hold the foaming agent therein. The temperature range, within which there is obtained viscoelasticity suitably adapted for foaming, differs depending on the type of resin and the amount of foaming agent, and is generally called proper foaming temperature range. The polypropylenie resin having a high degree of crystallization has viscoelasticity which greatly varies depending on a slight change of temperature when compared with other types of resins such as polystyrene, polyethylene and the like.

In this way, the proper foaming temperature range of polypropylene resin is very narrow, and when it is attempted to obtain a blow-molded foam at a relatively low expansion ratio, the ratio of a base resin to a foaming agent being added becomes so large that even though the viscoelasticity of the resin is low, a foaming agent can be satisfactorily held in the resin, thereby relatively easily keeping the extrusion temperature within a proper foaming temperature range. On the contrary, however, where the amount of a foaming agent is increased so as to obtain a blow-molded foam having a high degree of foaming, viscoelasticity sufficient to withstand foaming cannot be maintained. Especially, with blow molding, the parison extruded from a die should be in a softened condition until it is shaped in a mold. Eventually, to keep the softened state presents the drawdown problem caused by the weight of the foamed parison. In view of the relation with the melt viscosity capable of preventing the drawdown, limitation is placed on the extrusion temperature for the foamed parison, which makes it more difficult to set the extrusion temperature within a proper foaming temperature range.

We made further intensive studies based on the above knowledge, and as a result, arrived at the completion of the invention.

The present invention has for,its object the provision of a blow-molded foam of the type which is obtained by use of a polypropylene resin as a base resin, the product having a high expansion ratio which would have been difficult to attain in prior art techniques and has a large wall thickness.

The invention has as another object the provision of a process for producing a blow-molded foam which is able to produce a blow-molded foam having a high expansion ratio and a large wall thickness in a simple way.

DISCLOSURE OF THE INVENTION

The invention provides a blow-molded foam which is obtained by blow molding a parison in a desired form and has a foamed layer made of a base resin mainly composed of a polypropylene resin and in which a resin forming the foamed layer has, at 230° C., a melt tension (MT) of 5 gf or over and a melt flow rate (MFR) of 1 g/10 minutes or over, and the foamed layer has an average cell diameter of 0.05~2.2 mm, an average thickness of 0.5 mm or over, and an average density of 0.30 g/cm$^3$ or below.

The invention encompasses an arrangement wherein the foamed layer includes, as an inner layer and/or an outer layer, other layer or layers. In this case, other layer may be constituted of a resin, a woven fabric, a non-woven fabric, a metallic foil, a rubber or the like.

Where other layer is formed of a resin, the resin should preferably be one which comprises a polypropylene resin as its main component and has a density exceeding 0.3 g/cm$^3$. The resin whose density exceeds 0.3 g/cm$^3$ may be either a foamed resin or a non-foamed resin.

The resin having a density exceeding 0.3 g/cm$^3$ should preferably have such properties of a melt tension (MT) of 5 gf or over and a melt flow rate (MFR) of 1 g/10 minutes or over at 230° C. Moreover, the resin layer made of the above resin should preferably have an average thickness of 1~7 mm.

For the manufacture of the blow-molded foam of the invention, a foaming agent is added to a base resin which is mainly made of a polypropylene resin and has, at 230° C., a melt tension (MT) of 10 gf or over and a melt flow rate (MFR) of 0.5 g/10 minutes or over and melt-kneaded under high temperature and high pressure conditions by means of an extruder to provide a foamable melt. This melt is extruded from a die into a low-pressure zone to form a, parison having a foamed layer. Next, the parison in a softened condition is placed in a mold, and a pressurized gas is blown into the parison to obtain a blow-molded foam having the foamed layer.

Although a resin comprising a polypropylene resin as a main component is used as a base resin, the blow-molded foam of the invention has a foamed layer having an expansion ratio of 3 or over, and a thickness of 0.5 mm or over and can fully satisfy physical properties required for the blow-molded foam, such as a heat IBM resistance, heat insulation properties, sound proof properties, flexibility, rigidity and the like. Thus, the foam product can be favorably used in various applications such as of ducts, automotive parts, containers, electric appliance members and the like.

According to the process for producing the blow-molded foam of the invention, a novel,blow-molded foam, which has a foamed layer formed of a base resin comprising a polypropylene resin as a main component and having an expansion ratio of 3 or over and a thickness of 0.5 mm or over and which is excellent in surface smoothness, can be readily obtained.

BEST MODE FOR CARRYING OUT THE INVENTION

Now, the invention is described in detail.

Figure 1:
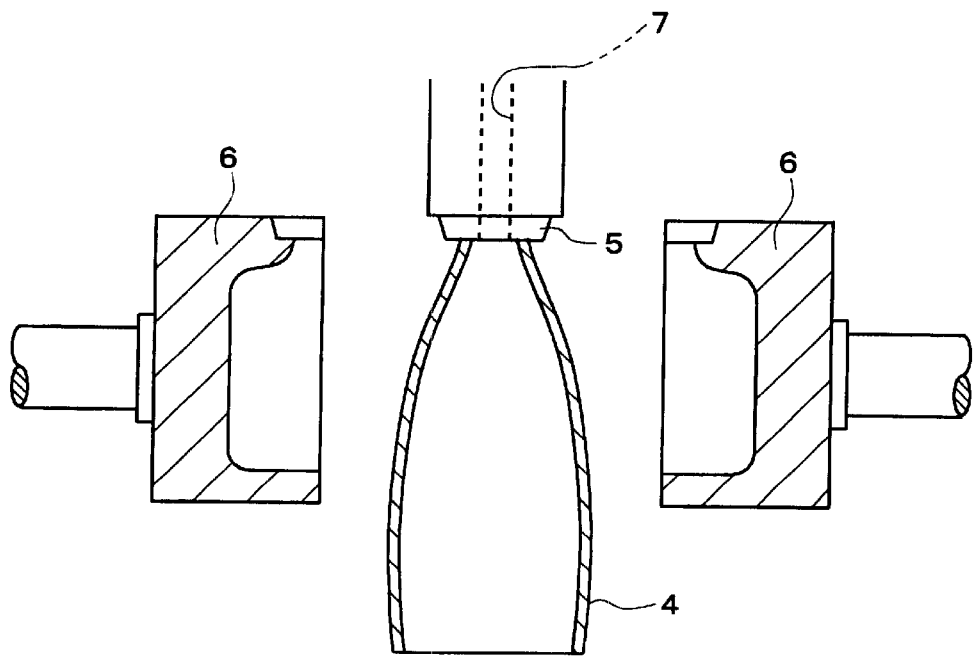
FIGS. 1(a) and 1(b) are, respectively, an illustrative view schematically showing an example of the manufacture of a blow-molded foam.
Figure 1:
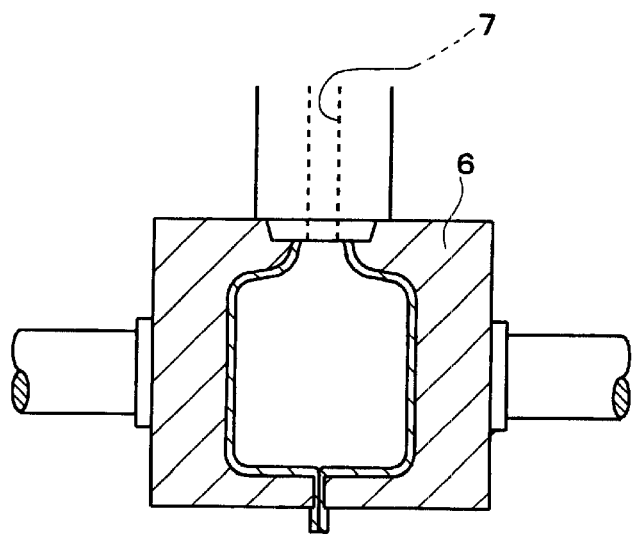

In the practice of the invention, a blow-molded foam is manufactured by adding a foaming agent to a base resin which is mainly composed of a polypropylene resin and which has a melt tension (MT) of 10 gf or over and a melt flow rate (MFR) of 0.5 g/10 minutes or over, both at 230° C., melt-kneading the mixture under high temperature and high pressure conditions by means of an extruder to provide a foamable melt, disposing an accumulator between a die and the extruder, if necessary, subjecting the melt to extrusion foaming from a circular die 5, as shown in FIG. 1(a), to form a cylindrical foamed parison 4, placing the parison 4, which is in softened condition, in molds 6, 6 after clamping the molds 6, 6 as shown in FIG. 1(b), followed by blowing a pressurized gas into the parison 4 from a gas blowing port 7 for blow molding in the form of a hollow shape conformed to a mold profile, thereby obtaining a blow-molded foam. It should be noted that FIG. 1 is an illustrative view schematically showing a mere example of the manufacture of a blow-molded foam, and it does not limit the process of producing a blow-molded foam according to the invention to the specific operation procedure shown in the figure.

Figure 2:
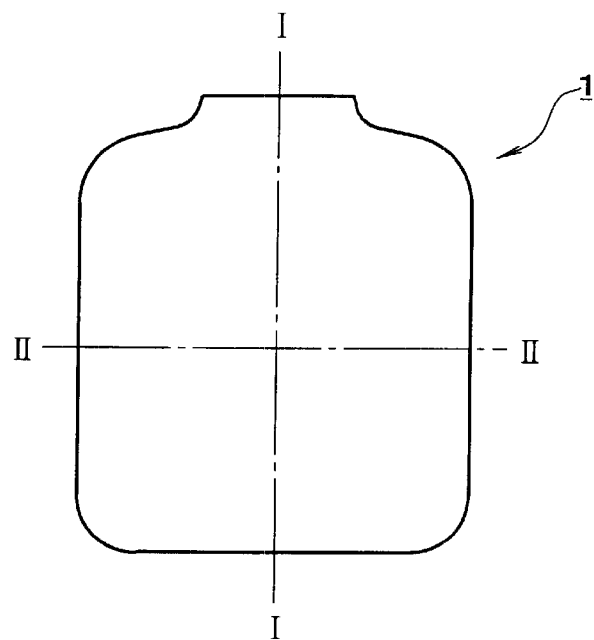
FIG. 2(a) is an illustrative view showing a cut portion of the blow-molded foam for measuring an average cell diameter.
FIG. 2(b) is a sectional view, taken along line I—I of FIG. 2(a), showing an example of a blow-molded foam of the invention.
Figure 2:
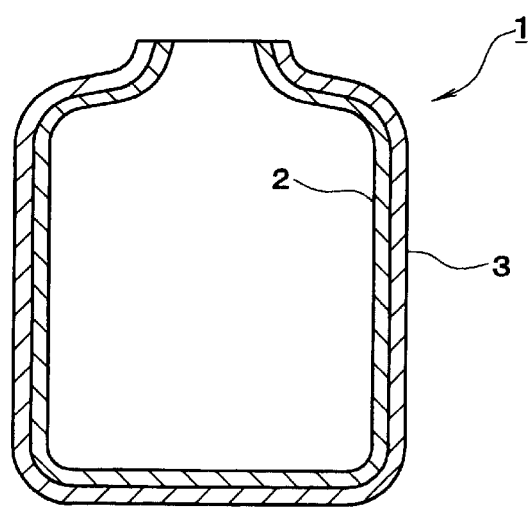

As stated hereinabove, in the practice of the invention, the foamable melt may be blow-molded into a foamed parison of a single layer formed by extrusion foaming to provide a blow-molded foam wherein the foam is constituted only of the foamed layer. If necessary, other layer (not limited to a woven or non-woven fabric, a metallic foil, or a layer of a resin such as rubber) may be laminated on the foamed layer at outer and/or inner side thereof to provide a multi-layered structure. This other layer may be a resin layer, a woven fabric layer, a non-woven fabric layer, a metallic foil layer, a rubber layer or the like. FIG. 2 shows an example of a blow-molded foam having the multi-layered structure. The blow-molded foam 1 shown in the figure has a form of container. As is particularly shown in FIG. 2(b), the foam 1 has a double-layered structure including a foamed layer 2 and a skin layer 3 laminated on the outer side of the foamed layer 2 and made of a thermoplastic resin. It should be noted that for the lamination of a skin layer other than that of a thermoplastic resin on the outer side of the foamed layer, there is adopted a method wherein the skin layer has been preliminarily attached to the inner wall of the molds for forming a parison, followed by introducing the foamed parison into the molds for blow molding.

For the manufacture of a blow-molded foam having a multi-layered structure according to the invention, base resins used to form individual layers are melt-kneaded in separate extruders before formation of a parison, and the resultant melts are joined together in a die, followed by extrusion into a low pressure zone to obtain a multi-layered parison and subjecting the parison to blow molding. For instance, where a resin layer is laminated on the outer side of the foamed layer, a base resin used to form other resin layer may be melt-kneaded in another extruder to provide a melt, which is,subsequently joined to the outside of a foamable melt within a die.

In the practice of the invention, it is preferred to provide an accumulator between the extruder and the die for the production of a blow-molded foam.

The provision of an accumulator enables one to extrude a resin at a high pressure, thereby ensuring an increasing discharge of the resin. Thus, the thickness and expansion ratio of the blow-molded foam can be increased, coupled with the advantage that drawdown can be effectively prevented.

The procedure using the accumulator is applicable not only to the production of a blow-molded foam with a single-layered structure, but also to:the production of a blow-molded foam having a multi-layered structure.

Figure 5:
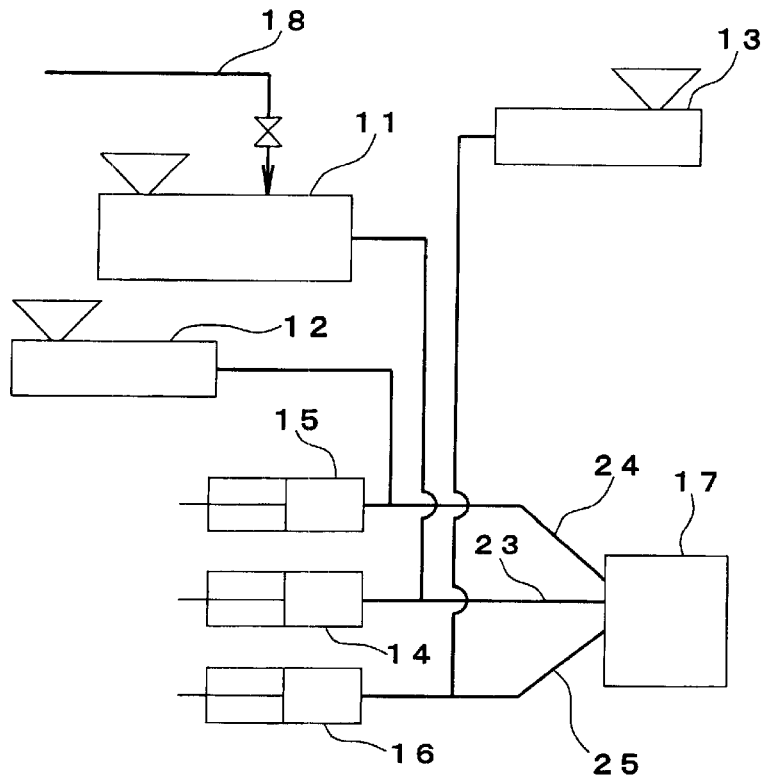
FIG. 5 is an illustrative view schematically showing an accumulator-equipped extruder.

FIG. 5 shows a procedure of producing a blow-molded foam having a multi-layered structure according to a method using an accumulator. There are provided an extruder 11 wherein a base resin for forming foamed layer is to be fed, an extruder 12 wherein a base resin for forming inner layer is to be fed, and an extruder 13 wherein a base resin for outer layer is to be fed. The extruder 11 is connected with an accumulator 14, the extruder 12 connected with an accumulator 15, and the extruder 13 connected with an accumulator 16, respectively. Molten resins are fed to a ring-shaped die 17 for multi-layer formation via the lines of these accumulators 14, 15 and 16. Indicated by 18 is a foaming agent feed line.

The resins are melt-kneaded in: the respective extruders 11, 12 and 13, after which desired volumes of the molten resins are fed therefrom into the accumulators 14, 15 and 16 set under high temperature and high pressure conditions, respectively. Thereafter, the molten resins are extruded through the strokes of the movable rams of the accumulators so as to supply the molten resins to the ring-shaped die 17 for multi-layer formation.

Figure 6:
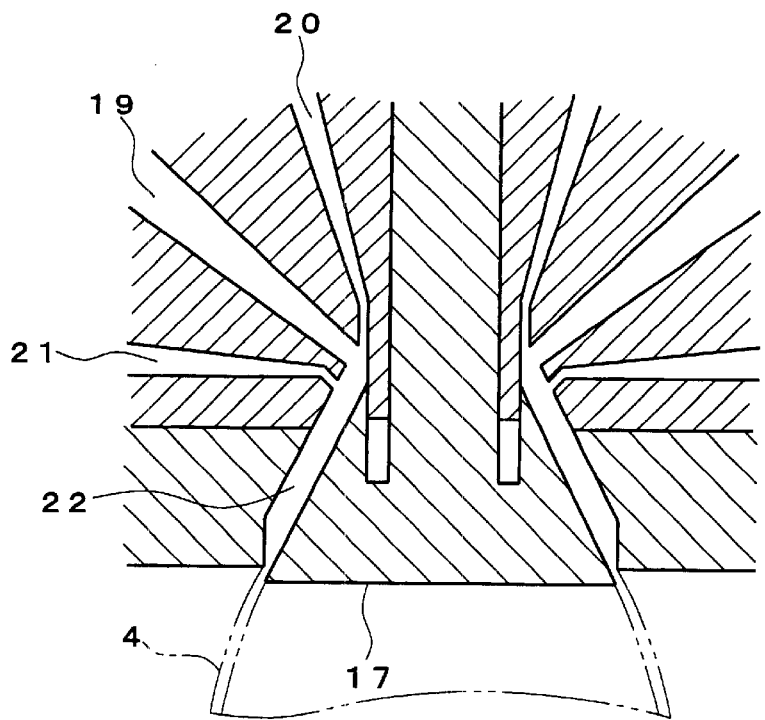
FIG. 6 is an enlarged sectional view of an essential part of a die attached to the accumulator-equipped extruder.

When the molten resins are fed into the ring-shaped die 17 for multi-layer formation, a gate at the tip of the ring-shaped die is simultaneously opened. As shown in FIG. 6, a resin passage 19 connected to a line 23 of the accumulator 14, a resin passage 20 connected to a line 24 of the accumulator 15, and a resin passage 21 connected to a line 25 of the accumulator 16 are respectively communicated with a delivery passage 22. Eventually, three types of molten resins passed from the respective resin passages are joined in the delivery passage 22 and extruded toward a low pressure zone. In this way, a cylindrical foamed parison 4 having a multi-layered structure is obtained, and this foamed parison 4 is set in molds and subjected to blow molding to obtain a blow-molded foam.

The method using the accumulators can solve the problem involved in a method making use of an apparatus wherein extruders are directly connected to a die, i.e., the problem that it is difficult to keep a die pressure at the time of the production of a blow-molded foam having a high expansion ratio and a large thickness. Since the die pressure can be maintained at a high level, it becomes possible to increase the amount of a foaming agent and also to increase an opening of the gate at the tip of the ring-shaped die. This ensures the manufacture of a blow-molded foam having a higher expansion ratio and a larger thickness. Moreover, the method using accumulators makes it possible to remarkably increase the discharge rate of a molten resin as high as 8~400 kg/hr cm$^2$, so that the drawdown problem of a foamed parison can be improved to a further extent. This enables one to obtain a blow-molded foam which is larger in size and which has thicker surface layers formed on inner and outer sides thereof.

Where the blow-molded foam of the invention is arranged in the form of a multi-layered structure, other resin layer laminated on the foamed layer is not limited to a non-foamed resin layer formed without addition of a foaming agent to a base resin, but may be a foamed resin layer. If the blow-molded foam is manufactured in such an arrangement as mentioned above, the resultant blow-molded foam has elasticities, being different between the outer and inner sides thereof when the expansion ratios of individual foamed layers are changed. However, in case where a separate foamed layer is further laminated on the foamed layer, the foamed layer having an average density of 0.3 g/cm$^3$ or below should satisfy :the requirements defined in the invention with respect to the average cell diameter and the average thickness.

When a parison is formed by extrusion of melt of base resins, the base resins used to form the foamed layer and other resin layer laminated on the formed layer may further comprise, if necessary, various types of additives such as cell adjusting agents, flame retardants, fluidity improvers, weathering agents, colorants, heat stabilizers, fillers, antistatic agents, conductivity-imparting agents and the like.

The blow-molded foam of the invention is a hollow molding having, at least, a foamed layer. In the invention, the foamed layer is mainly composed of a polypropylene resin and is obtained by subjecting, to expansion blow molding, a base resin which has, at 230° C., a melt tension (MT) of 10 gf or over and a melt flow rate (MFR) of 0.5 g/10 minutes or over. The polypropylene resin, which have such values of the melt tension (MT) and the melt flow rate (MFR) as defined above (hereinafter referred to as "specified polypropylene resin"), can be obtained, for example, according to the following procedure.

More particularly, an ordinary polypropylene resin having a small MT value (hereinafter referred to as "starting polypropylene resin" which is differentiated from the specified polypropylene resin and consists of an ordinary polypropylene resin used to obtain the specified polypropylene resin), a peroxide having a half-life-in-one-minute temperature (i.e., a temperature at which the half-life of a peroxide is at 1 minute) lower than the melting point of the starting polypropylene resin, and a main chain breakage inhibitor are charged into an aqueous medium and agitated. The peroxide and the main chain breakage inhibitor are impregnated in the starting polypropylene resin under temperature and time conditions sufficient to suppress the peroxide from being decomposed to a minimum and permit the charged peroxide to be left in an amount corresponding to at least a half of the total amount thereof. Subsequently, the mixture is kept for a predetermined time under temperature conditions corresponding to the half-life-in-one-minute temperature of the peroxide used herein to cause the peroxide to be decomposed, by which the starting polypropylene resin undergoes treatment such as slight crosslinkage so that the starting polypropylene resin has a gel fraction of less than 1% without melting thereof, thereby obtaining the specified polypropylene resin.

In the above procedure, as the starting polypropylene resin, there can be used a propylene homopolymer and copolymers of propylene and other types of monomer components. Other types of monomers include ethylene, 1-butene, isobutylene, 1-pentene, 3-methyl-1-butene, 1-hexene, 3,4-dimethyl-1-butene, 1-heptene, 3-methyl-1-hexene and the like. The copolymer may be either a random copolymer or a block copolymer.

Where a copolymer is used-as the starting polypropylene resin, other type of monomer component should preferably be present in the copolymer, without impeding the inherent characteristics of polypropylene, in an amount of 5.0 wt % or below for random copolymer and 20.0 wt % or below for block copolymer.

Such a starting polypropylene resin as set out above may be used not only singly, but also in combination of two or more. If necessary, the starting polypropylene resin may be blended, within a range not impeding the inherent characteristics of polypropylene, with other resin components including ethylene resins such as high density polyethylene, low density polyethylene, linear low density polyethylene, very low density polyethylene, ethylene-butene copolymers, ethylene-maleic anhydride copolymers and the like; butene resins; vinyl chloride resins such as polyvinyl chloride, vinyl chloride-vinyl acetate copolymers and the like; and styrene resins.

The peroxides used for slight crosslinkage of the starting polypropylene resin in the present invention include, for example, lauroyl peroxide, m-toluoyl-benzoyl peroxide, benzoyl peroxide, bis(4-butylcyclohexyl)peroxydicarbonate and the like. Of these, those compounds whose half-life-in-one-minute temperature is lower than the melting point of a starting polypropylene resin are selected.

The main chain breakage inhibitor is for preventing the main chain of the starting polypropylene resin from being broken by means of the peroxide and includes, for example, methyl methacrylate, divinylbenzene, triallyl cyanurate or the like. For the aqueous medium, it is usual to use water to which a surface active agent is added.

The above-stated procedure is a mere example of obtaining the specified polypropylene resin. The resin mainly composed of a polypropylene resin used as a base resin for forming the foamed layer in the invention is not limited to ones obtained by the above procedure. So far as a specified polypropylene resin having such a melt tension (MT) and a melt flow rate (MFR) as defined in the invention is obtained, any procedure of obtaining the specified polypropylene resin may be used. However, if the melt tension (MT) and melt flow rate (MFR) are outside the ranges defined in the invention, a foamed layer having an expansion ratio of 3 or over and a thickness of 0.5 mm or over cannot be formed.

Especially, where the melt flow rate (MFR) is less than 0.5 g/10 minutes, a difficulty is involved in extrusion of the resin unless a higher extrusion temperature is employed. The extrusion at a higher temperature leads to the lowering in viscoelasticity of the resin and the dissipation of a foaming agent from the base resin, under which only an open-cell foam is obtained. In addition, when the melt tension (MT) is less than 10 gf, a blow-molded foam having an expansion ratio of 3 or over and a thickness of 0.5 mm or over cannot be obtained as set forth in the Prior Art.

On the other hand, when the melt tension (MT) exceeds 50 gf, the melt flow rate (MFR) tends to be below 0.5 g/10 minutes. On the contrary, when the melt flow rate (MFR) exceeds 30 g/10 minutes, the melt tension (MT) tends to be below 10 gf, with the apprehension that it becomes difficult to obtain a good-quality blow-molded foam. Taking the above into account, the base resin, which is mainly composed of a polypropylene resin and charged into an extruder for obtaining a foamed layer in the invention, should preferably have a melt tension (MT) of 10~50 gf, more preferably 15~30 gf, and a melt flow rate (MFR) of 0.5~30 g/10 minutes, more preferably 1~10 g/10 minutes and most preferably 2~10 g/10 minutes.

In the practice of the invention, the specified polypropylene resin may be used as a base resin as it is, and may be appropriately mixed with other resin components, if necessary. Other resin components to be mixed with the specified polypropylene resin include those exemplified as other resin components that can be mixed with the starting polypropylene resin in the procedure set out as an instance of obtaining the specified polypropylene resin, and also ordinary polypropylene resins. However, if the ratio of a resin component other than polypropylene resins in the base resin becomes too high, the characteristic properties of the polypropylene resin will be impeded. Accordingly, where other type of resin component is mixed with a starting polypropylene resin in order to obtain the specified polypropylene resin, or where a resin component of the type other than polypropylene resins is mixed with the specified polypropylene resin to prepare a base resin, these polypropylene resins should be contained in the base resin in amounts of 70 wt % or over, preferably 80 wt % or over.

Where a base resin is prepared by mixing other type of resin component with the specified polypropylene resin, the mixing ratio of the other type of resin component should be appropriately controlled so that the resultant base resin has such values of the melt tension (MT) and melt flow rate (MFR) as defined in the invention.

The melt tension (MT) of the base resin can be measured, for example, according to a melt tension tester Model II, made by Toyo Seiki Seisaku-Sho, Ltd. and the like. More particularly, a melt tension tester having an orifice with an orifice diameter of 2.095 mm and a length of 8 mm is used, and a resin is extruded from the orifice in the form of a string under conditions of a resin temperature of 230° C. and a piston speed of 10 mm/minute. This string-shaped material is wound about a tension detecting pulley having a diameter of 45 mm and taken up by means of a take-up roller with a diameter of 50 mm while gradually increasing the take-up speed at a rate of 5 r.p.m./second (take-up acceleration rate of the string: $1.3 \times 10^{-2}$ m/second$^2$).

Figure 3:
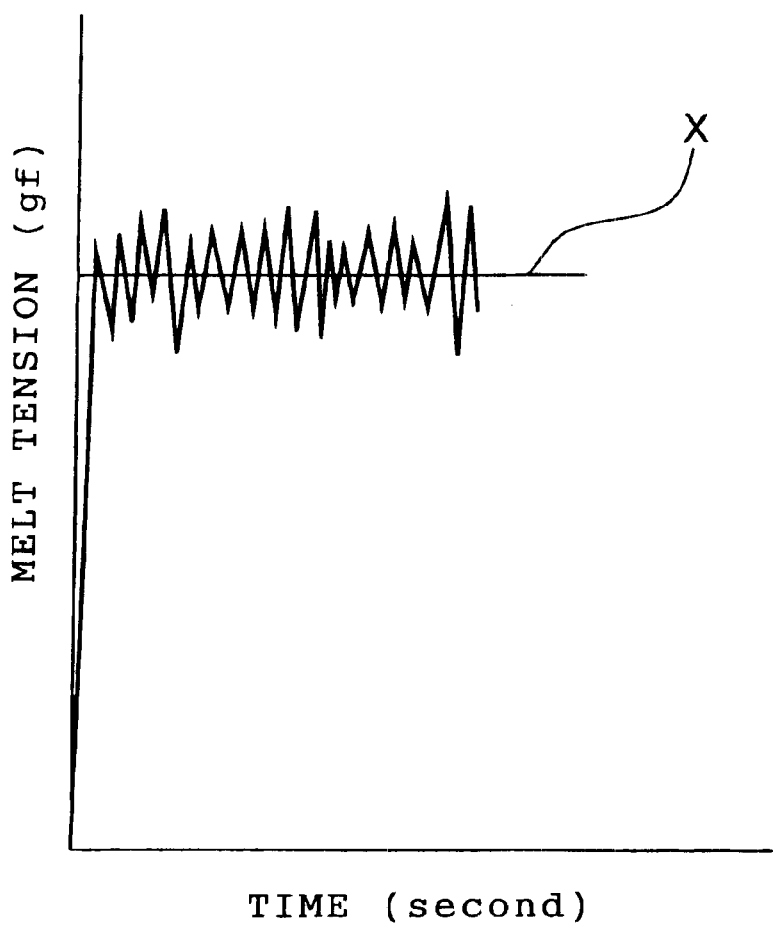
FIG. 3 is a graph showing a tension of a resin which is extruded in the form of a string from the nozzle of a melt tension tester and the string-shaped melt is taken up by means of a take-up roller at a given take-up speed.

In the invention, in order to-determine the melt tension (MT), the take-up rate is increased until the string-shaped material on the tension-detecting pulley is broken to obtain a take-up rate R (r.p.m.) at which the string is broken. Next, the take-up operation is repeated at a constant take-up rate of R×0.7 (r.p.m.), during which the melt tension (MT) of the string, which is detected by means of a detector connected to the tension detecting pulley, is measured as a function of time, followed by depiction of MT (gf) along the ordinate and the time (second) along the abscissa, thus obtaining a graphic chart having such amplitudes as shown in FIG. 3. In FIG. 3, the MT in the invention is determined as a median (X) of the amplitudes at a portion where the amplitudes become stable. It will be noted that where the string is not broken even when the take-up rate reaches at 500 (r.p.m.), a value, which is obtained at a take-up rate of 500 (r.p.m.), is defined as the melt tension (MT) of the string. It will also be noted that a specific amplitude which unusually occurs is neglected. The melt flow rate (MFR) is set as the one measured under conditions of 230° C. and a load of 2.16 kgf described in JIS K7210.

The base resin used to obtain the foamed layer in the invention is mainly composed of a polypropylene resin and makes use of the specified polypropylene resin having as such values of melt tension (MT) and melt flow rate (MFR) as defined before, by which it becomes possible to provide a foamed layer having a thickness of 0.5 mm or over and an expansion ratio of 3 or over. However, when merely using a polypropylene resin having specified values of melt tension (MT) and melt flow rate (MFR), the resulting molded product has some possibility that it has a greatly irregular surface, thus with a poor appearance, the thickness of the resulting parison does not become uniform, and a difficulty is involved in molding depending on the shape of the molded foam product, in comparison with the case where an ordinary polypropylene resin is used to form a foamed layer having an expansion ratio of less than 3.

This is ascribed to the fact that the base resin of a high melt tension used in the invention contributes to the high expansion ratio, but has poor fluidity in the die, with the result that when extruded from the die, the resin is disturbed in its flow, under which irregularities occur on the surface of the parison (such a phenomenon being generally called "melt fracture").

In order to avoid the occurrence of the irregularities caused by the melt fracture, it may be considered that the extrusion temperature is so elevated as to lower the viscoelasticity of the resin, thereby causing the fluidity to increase. To this end, the extrusion temperature should be at an appreciably high level. If a high extrusion temperature is used, the melt tension of the resin lowers, and the resulting extruded foam involves breakage or shrinkage of cells. Thus, there cannot be obtained a parison of good quality suitable for blow molding and also a molded foam of good quality.

In the practice of the invention, where a resin, which is made primarily of the polypropylene resin and has defined ranges of a melt tension (MT) and a melt flow rate (MFR), is used as the base resin to form the foamed layer, it is preferred that a volatile foaming agent having an SP value of 6 or over is employed as a foaming agent and its added amount is in the range of 0.1~2.0 moles per 1 kg of the base resin so as to prevent the occurrence of the melt fracture.

More particularly, when such a volatile foaming agent is provided as a foaming agent and is added to in a specified amount, the volatile foaming agent exhibits the plasticizing effect on the base resin and improves the fluidity of the resin in the die, thereby preventing the melt fracture from occurring. Moreover, when the resin is extruded and expanded, the high melt tension of the base resin is shown to obtain a parison of good quality which undergoes a satisfactory degree of foaming, has a reduced degree of surface irregularities caused by the melt fracture and is suitable for expansion blow molding, resulting in the formation of a high-quality molded foam.

The volatile foaming agent include, for example, aliphatic hydrocarbons such as normal butane, isobutane, a mixture of normal butane and isobutane, pentane, hexane and the like, chlorinated hydrocarbons such as methyl chloride, ethyl chloride and the like, and fluorinated hydrocarbons such as 1,1,1,2-tetrafluoroethane, 1,1-difluoroethane and the like. These volatile foaming agents may be used in combination. These agents may be used in combination with decomposable foaming agents such as sodium hydrogencarbonate, sodium citrate, azodicarbonamide and the like, liquids such as various types of alcohols whose boiling point is below an extrusion temperature, and inorganic gases such as carbon dioxide, nitrogen and the like, within, a range not impeding the plasticizing effect of the volatile foaming agent.

It is to be noted that the SP value can be calculated as a square root of a cohesive energy density (cal/cc).

The added amount of the volatile foaming agent relative to the base resin is appropriately selected within the above-defined range depending on the type of foaming agent and a desired expansion ratio. If the added amount of the volatile foaming agent is less than the above range, the plasticizing effect on the base resin does not act satisfactorily. Over the above range, foaming takes place inside the die, thus leading to the disadvantage that a satisfactory foamed product cannot be obtained. In order that these disadvantages are more unlikely to occur, it is preferred that the amount of the volatile foaming agent is in the range of 0.2~1.5 moles per 1 kg of a base resin.

In order to show a satisfactory plasticizing effect on the base resin, it is important that the volatile foaming agent is kept as dissolved in the base resin until it is extruded from the die. The parison formed with the foamed layer at a desired expansion ratio should have most of the volatile foaming agent left in the cells formed in the foamed layer after the base resin has been extruded from the die and undergone foaming, by which the moldability such as of the elongation of the parison and maintenance of the cells can be appropriately controlled in the blow molding step where a gas is blown into the parison. Although it depends on the type and amount of volatile foaming agent and also on the intended expansion ratio, it is preferred in the practice of the invention that when measured through gas chromatography immediately after completion of cooling (heat dissipation) of a foam withdrawn from a mold after blow-molding in the mold, the amount of the volatile foaming agent left in the foamed layer is in the range of 0.5~20 wt % (weight of the volatile foaming agent based on the weight of the foamed layer including the volatile foaming agent).

In the present invention, where a volatile foaming agent is used as a foaming agent and an outer layer, such as the skin layer 3 made of a non-foamed resin, is formed as non-foamed on the outer side of the foamed layer 2 as an instance shown in FIG. 2(b), the base resin forming the outer layer should preferably be made of a polypropylene resin as a main component and have a melt tension (MT) of 5 gf or over and a melt flow rate (MFR) of 0.5 g/10 minutes or over, both at 230° C.

Figure 4:
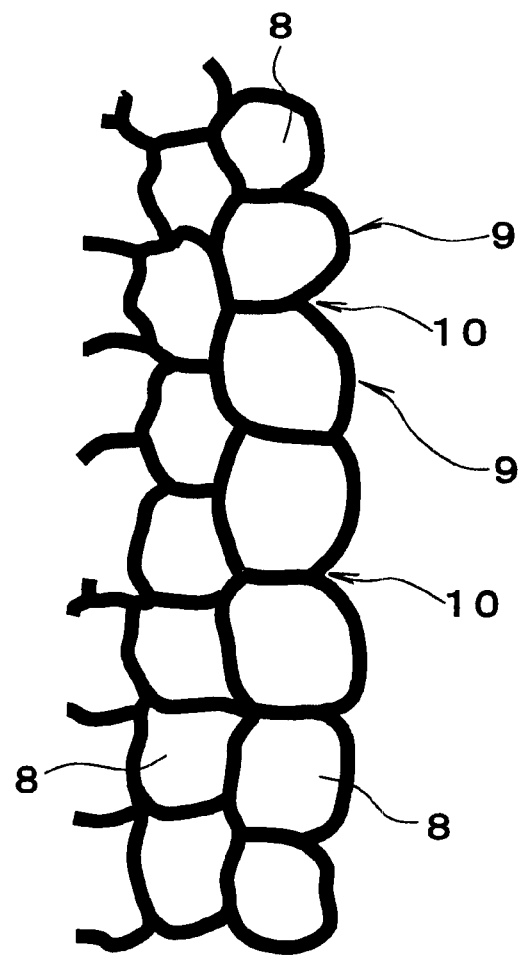
FIG. 4 is an enlarged sectional view of an essential part schematically showing a surface portion of a foamed layer.

In this case, when the outer layer is formed so that the values of the melt tension (MT) and the melt flow rate (MFR) are within the afore-defined ranges, respectively, the resultant blow-molded foam becomes particularly excellent in appearance. The reason for this is considered as follows.

Where a volatile foaming agent is used, there is the tendency that the size of the cells in the foamed layer becomes large depending on the type thereof. When the cells are large in size, the difference in height between a peak 9 of a cell 8 and a valley-shaped portion 10 formed in conjunction with an adjacent cell also becomes large as shown in FIG. 4. No trouble occurs in the case where another layer is not formed on the outer side of the foamed layer. However, if an outer layer, such as a skin layer 3 or the like, made of a non-foamed resin is provided on the outer side of the foamed layer 2 wherein the base resin forming the outer layer has such values of MT and MFR smaller than those defined before, the base resin forming the non-foamed layer, which is positioned at the peak portion of the cell, is moved back by the foaming action or the like in the foamed layer upon forming parison and blow molding. The moved-back resin enters the valley-shaped portion between the adjacent cells. As a consequence, the outer layer suffers thickness irregularity, thus not only impeding the appearance of the resulting foam, but also causing irregularity in elongation owing to the thickness irregularity of the outer layer at the time of blow molding. In some case, a hole is made in the outer layer, with the attendant disadvantage that the foamed layer is partially exposed to outside, thus degrading the appearance of the foam.

If the outer layer is formed of a base resin, which is mainly composed of a polypropylene resin and has values of melt tension (MT) and melt flow rate (MFR) as defined before, such disadvantages as set out above can be avoided. In order to more effectively avoid the disadvantages, it is more preferred to set the melt tension (MT) of the base resin forming the outer layer at 10~30 gf and the melt flow rate (MFR) at 1~10 g/10 minutes.

In the practice of the invention, a decomposition-type foaming agent may be used as a foaming agent. However, it should be noted that because the plasticizing effect as in the volatile foaming agent cannot be expected for the decomposition-type foaming agent, the irregularities caused by the melt fracture are formed in the parison surface as stated hereinabove if such a foaming agent is used as it is, with the high possibility of causing the appearance of the foam mold to be impeded. In this case, the outer layer, which is made of a base resin having good fluidity, is formed on the outer side of the foamed layer, under which where a base resin having a high melt tension is used to form a foamed layer, the boundary between the wall surface of the die and the resin in the vicinity of the die's lip is covered with the good fluidity resin for the outer layer. Thus, fluidity is ensured, and as a result, the irregularities ascribed to the melt fracture are reduced, even when using a decomposition-type foaming agent, thereby enabling to obtain the parison having good appearance.

When using decomposition-type foaming agent as described above, the melt flow rate of a base resin mainly composed of a polypropylene resin used as the outer layer is at 1 g/10 minutes or over, preferably 2 g/10 minutes or over. When using a resin having an MFR value of less than 1 g/10 minutes, the resin of the outer layer becomes high in viscosity in the die to make a non-uniform flow, resulting in clogging in the lip and accordingly a good parison is not obtained. Besides, the upper limit of MFR is generally 50 g/10 minutes and if an MFR value is high, there is some possibility that a light degree of irregularity occurs on the surface of a parison although the degree does not hinder the molding.

The decomposition-type foaming agents are those which are able to decompose at a temperature in an extruder to generate an inorganic gas or the like such as sodium hydrogencarbonate, sodium citrate, azodicarbonamide and the like.

Where a foamed layer with a low expansion ratio exceeding a density of 0.3 g/cm$^3$ is formed as an outer and/or an inner layer of a foamed layer having a density of 0.3~0.03 g/cm$^3$, a foamed layer having a low expansion ratio can be provided according to a co-extrusion foaming procedure wherein a composition comprising, for example, a decomposition-type foaming agent and an ordinary polypropylene resin is used to form the outer layer and/or the inner layer.

It will be noted that according to the method using such an accumulator as set forth before, the occurrence of irregularities on the parison surface ascribed to the melt fracture can be prevented irrespective of the choice in type of a foaming agent and a resin.

In the invention, the blow-molded foams are made as stated hereinabove, among which those products of the type that a resin forming the foamed layer preferably has a melt tension (MT) of 5 gf or over, more preferably 7~30 gf, at 230° C. and a melt flow rate (MFR) of 1 g/10 minutes or over, more preferably 2~10 g/10 minutes and that the foamed layer has an average cell diameter of 0.05~2.2 mm, an average thickness of 0.5 mm or over, more preferably 5~50 mm, and an average density of 0.30 g/cm$^3$ or below, satisfy various physical properties required for the blow-molded foam, such as heat insulating properties, sound proof properties, flexibility, heat resistance and the like. Thus, these products can be suitably employed in various fields, including ducts, automotive parts, containers and the like. Especially, in the multi-layered blow-molded foams, those products wherein a resin layer having a density exceeding 0.3 g/cm$^3$ is provided as the layers formed on the inner and outer sides of the foamed layer, respectively, are preferred because a foamed layer having a satisfactory thickness and a satisfactory expansion ratio can be formed. Moreover, when the resin layer formed, at least, as the outer layer has a melt tension (MT) of 5 gf or over and a melt flow rate (MFR) of 1 g/10 minutes or over, a better appearance is ensured and the effect of preventing drawdown can be expected, thereby obtaining a blow-molded foam having a uniform thickness.

In the multi-layered blow-molded foam, a resin layer made of a foamed or non-foamed resin whose density exceeds 0.3 g/cm$^3$ generally has an average thickness of 0.02 mm or over, preferably 0.1 mm or, over, and more preferably 1~7 mm. If the thickness of the resin layer is smaller than 0.02 mm, irregularities occur on the surface of the resulting foam, with the possibility that its appearance becomes worsened. On the other hand, when the thickness of the resin layer is too large, the cooling of the foamed layer is not performed adequately at the time of molding and the foamed layer is caused to be shrunk, with the fear that a foamed layer of good quality cannot be obtained.

The melt tension (MT) and melt flow rate (MFR) of the resin forming the foamed layer can be, respectively, determined in the same manner as stated before using a sample obtained by cutting off a piece from the foamed layer, placing and thermally melting it in a vacuum oven at 200° C. for approximately 15 minutes and then degassing. Usually, when the MT and MFR of a base resin made of the specified polypropylene resin as stated before are compared with the MT and MFR of a resin forming a foamed resin which is formed by expanding the base resin, the value of the melt tension (MT) of the foamed layer-forming resin, which is determined under temperature conditions of 230° C. by measuring the foamed layer after melting by heat and degassing, is slightly lower than that of the base resin. The melt flow rate (MFR) of the foamed layer-forming resin is slightly higher than that of the base resin.

The average cell diameter of the foamed layer used herein is obtained in the following manner. Initially, a molded foam 1 is, respectively, cut along the central axes of the direction of extrusion of a parison and the direction of section vertical to the extrusion direction of the parison (i.e., the line I—I in FIG. 2 (provided that the face in conformity with the joint surface of molds 6, 6 is avoided) and the line II—II) (wherein if the foam is not symmetrical in shape, it is cut at a portion corresponding to the central axis). These sections are enlarged by means of a microscope or the like and projected on a screen or a monitor in a manner as described in ASTM-D3576. Thereafter, straight lines are, respectively, drawn in directions corresponding to the direction of thickness of the foamed layer on the projected image, the extrusion direction of the parison on the projected image, and a direction intersecting at right angles relative to the extrusion and thickness directions of the parison on the projected image(in which with respect to the extrusion direction of the parison and the direction intersecting at right angles relative to the extrusion direction and the thickness direction of the parison, the lines may be curved in some case) to count the number of cells crossing with each straight line (or curved line). The true lengths of the respective straight lines (i.e., lengths prior to the enlarged projection) are, respectively, divided by the numbers of cells to obtain values. These values are, respectively, defined as average cell diameters for the thickness direction of the foamed layer, the extrusion direction of the parison and the direction intersecting at right angles relative to the extrusion and thickness directions of the parison. Moreover, the value obtained by arithmetic means to average these diameters is defined as an average cell diameter of the foamed layer. The average cell diameter along the thickness direction of the foamed layer is determined from the section (i.e., the line II—II in FIG. 2(*a*)) along the central axis of the molded foam along a direction of section vertical to the extrusion direction of the parison.

The average thicknesses of a foamed layer and a resin layer used herein are determined by measuring thicknesses of the foamed layer and the resin layer at a section (i.e., the line II—II in FIG. 2(a)), whose direction is vertical to the extrusion direction of the parison, at intervals of 10 mm and averaging the measurements. The average density of the foamed layer is obtained by cutting off a plurality of sample pieces from a foamed layer along the line II—II in FIG. 2(a) and dividing the weight (g) of the respective sample pieces by a volume ($cm^3$) obtained by immersing each sample piece in water at 23° C. to provide a density of each sample piece, followed by arithmetic means to average these densities.

In case where it is difficult to cut off a sample piece from a foamed layer because of the insufficiency in thickness of the foamed layer in a multiple-layered blow-molded foam, a plurality of sample pieces having a multi-layered arrangement including a foamed layer are cut off from the blow-molded foam along the line II—II in FIG. 2(a). The density of the foamed layer of the respective sample pieces is calculated on the basis of the thickness, volume and weight of individual sample pieces and also on the densities, thicknesses and volumes of base materials in the layers other than that of the foamed layer, of which the sample is formed. The average density of the foamed layer is obtained by arithmetic mean of the resultant measurements.

In the blow-molded foam of the invention, when the average cell diameter in the foamed layer is larger than the above-defined range, the foam is degraded in heat insulation property and flexibility. On the contrary, when the average cell diameter in the foamed layer is smaller than the above range, the resultant foam is disadvantageous in that when a parison is formed, corrugation takes place, thus leading to the poor appearance of the foam. In order to more effectively, avoid this disadvantage, the average cell diameter in the foamed layer should preferably be in the range of 0.08~1.8 mm.

The properties, particularly, heat insulation properties, compression and bending characteristics and the like, of the foamed layer are greatly influenced by the shape of cell as well as the average cell diameter. A preferred cell shape differs depending on the properties to be imparted to the foamed layer. The average cell diameter and cell shape can be adjusted by controlling the type and amount of foaming agent to change the degree of drawdown of a parison, or by changing a blow ratio or controlling a gas blowing pressure at the time of molding, thereby obtaining a desired average cell diameter and a desired shape of cell.

In the blow-molded foam of the invention, the foamed layer has, aside from the average cell diameter, defined ranges of an average thickness and an average density. If the average thickness of the foamed layer is smaller than the defined range, the properties inherent to the foam, such as heat insulating properties and the like, cannot be imparted to the foam.

On the contrary, when the average density of the foamed layer exceeds the defined range, the resulting product becomes poor in heat insulation properties, sound proof properties, flexibility and the like, thereby not achieving the purposes of the invention. The lower limit in average density of the foamed layer is generally at 0.03 $g/cm^3$. If the density is smaller than this value, the resultant foam is unfavorably short of strength. Taking this into account, the average density of the foamed layer should preferably be in the range of 0.03~0.25 $g/cm^3$, more preferably 0.04~0.25 $g/cm^3$.

EXAMPLES

The invention is described in more detail by way of examples and comparative examples.

Example 1

A mixture of 100 parts by weight of a base resin for foamed layer indicated in Table 1 and 3 parts by weight of a master batch of a polyethylene-based cell controlling agent, in which 5 wt % of sodium citrate and 10 wt % of talc were formulated, was fed into an extruder having a bore diameter of 65 mm. Butane (SP value of 6.6) used as a volatile foaming agent was forced into and kneaded with the resin on the way of the extruder at a ratio of 0.43 moles per 1 kg of the base resin to provide a foamable melt. Next, the melt temperature was adjusted to 163° C., and the melt was extruded from a die to obtain a single-layered foamed parison. The thus obtained parison underwent a great degree of foaming to such an extent that cells were observed on the surface. Nevertheless, no irregularity was found on the parison surface as would have been caused by melt fracture, thus the parison having a good appearance.

Subsequently, the parison was placed in a 4-litter-bearing bottle-shaped mold with handle located beneath the die. After clamping, a pressurized gas (air) having a pressure of 500 $g/cm^2$ was blown into the parison and blow-molded, thereby obtaining a well blow-molded foam constituted of a foamed layer alone.

The resin forming the foamed layer of the thus obtained blow-molded foam (and also the resins of inner and outer layers, if present) was subjected to measurement of a melt tension (MT) and a melt flow rate (MFR) according to the procedures set out before. The results are shown in Table 1. Moreover, the average cell diameter, average thickness (average thickness of inner layer, foamed layer and outer layer) and average density of the foamed layer were, respectively, determined according to the procedures set forth before. The results are shown in Table 2. It will be noted that these measurements were likewise conducted in the following examples and comparative examples. With respect to the case using a volatile foaming agent as a foaming agent, the product was blow-molded and removed from the mold, 10 minutes after which the amount of the volatile foaming agent left in the foamed layer was measured by gas chromatography, with the results also shown in Table 2.

Example 2

A mixture of 100 parts by weight of a base resin for foamed layer indicated in Table 1 and 3 parts by weight of a master batch of a polyethylene-based cell controlling agent, in which 5 wt % of sodium citrate and 10 wt % of talc were formulated, was fed into an extruder having a bore diameter of 65 mm. Butane (SP value of 6.6) used as a volatile foaming agent was forced into and kneaded with the resin on the way of the extruder at a ratio of 0.43 moles per 1 kg of the base resin to provide a foamable melt. On the other hand, a base resin for inner layer and a base resin for outer layer, both indicated in Table 1, were provided, in which a colorant was formulated, respectively, and the respective resins were separately fed into two extruders each having a bore diameter of 40 mm to provide non-foamable melts. Next, the melts which were melt-kneaded in the respective extruders were poured from an upstream portion of a die in such a way that the non-foamable melts were joined at inner and outer sides of the foamable melt in the die while adjusting the temperatures thereof to 163° C., followed by extrusion from the die to form a parison having a three-layered arrangement of inner layer/foamed layer/outer layer. The thus formed parison had the foamed layer undergoing a great degree of foaming and had a smooth surface, thus being good in appearance. A pressurized gas was blown into the parison for blow molding in the same manner as in Example 1 to obtain a blow-molded foam of good quality.

Example 3

A mixture of 100 parts by weight of a base resin for foamed layer indicated in Table 1 and 4 parts by weight of a master batch of a polyethylene-based decomposition-type foaming agent, in which 40 wt % of sodium citrate was formulated, was fed into an extruder having a bore diameter of 65 mm, followed by melt-kneading to provide a foamable melt. On the other hand, a base resin for inner layer and a base resin for outer layer, both indicated in Table 1, were provided, in which a colorant was formulated, respectively, and the resins were separately fed into two extruders each having a bore diameter of 40 mm to provide non-foamable melts. Next, the melts, which were, respectively, melt-kneaded in the extruders, were poured from an upstream portion of a die in such a way that the non-foamable melts were joined at inner and outer sides of the foamable melt in the die while adjusting the temperatures thereof to 163° C., followed by extrusion from the die to form a parison having a three-layered arrangement of inner layer/foamed layer/outer layer. The resultant parison had a foamed layer expanded to an appreciable degree and had no irregularity on the surface thereof as would have been caused by melt fracture. A pressurized gas was blown into the parison for blow molding in the same manner as in Example 1 to obtain a blow-molded foam of good quality.

Example 4

In the same manner as in Example 3 using a resin, indicated in Table 1, as a base resin for outer layer, there was obtained parison. The thus formed parison underwent a great degree of foaming and no irregularity was observed on the surface thereof as would have been caused by melt fracture. The parison was blown with a pressurized gas in the inside thereof for blow molding in the same manner as in Example 1 to obtain a blow-molded foam of good quality.

Example 5

A mixture of 100 parts by weight of a base resin for foamed layer indicated in Table 1 and 3 parts by weight of a master batch of a polyethylene-based cell-controlling agent, in which 5 wt % of sodium citrate and 10 wt % of talc were formulated, was fed into an extruder having a bore diameter of 65 mm. Butane (SP value of 6.6) used as a volatile foaming agent was forced into and kneaded with the resin on the way of the extruder at a ratio of 0.43 moles per 1 kg of the base resin to provide a foamable melt. On the other hand, a base resin for outer layer, indicated in Table 1, was provided, in which a colorant was formulated, and this resin was fed into an extruder having a bore diameter of 40 mm to provide a non-foamable melt. Next, the melts, which were melt-kneaded in the respective extruders, were poured from an upstream portion of a die in such a way that the non-foamable melt was joined at an outer side of the foamable melt in the die while adjusting the temperatures thereof to 163° C., followed by extrusion from the die to form a parison having a double-layered arrangement of foamed layer/outer layer. The foamed layer of the resultant parison underwent a great degree of foaming and had a good smooth surface. A pressurized gas was blown into the parison for blow molding in the same manner as in Example 1 to obtain a blow-molded foam of good quality.

Example 6

A mixture of 100 parts by weight of a base resin for foamed layer indicated in Table 1 and 3 parts by weight of a master batch of a cell controlling agent (i.e., a master batch comprising a base resin of low density polyethylene, 5 wt % of sodium stearate and 10 wt % of talc) was fed into an extruder having a bore diameter of 65 mm. Butane used as a foaming agent was forced into and kneaded with the resin on the way of the extruder at a ratio of 0.43 moles per 1 kg of the base resin to provide a foamable melt. Next, the melt temperature was adjusted to 169° C., and the melt was charged into an accumulator. Thereafter, a ram of the accumulator was pressed, and at the same time, a gate disposed at the tip of the die was opened to cause the melt to be discharged from the die at a discharge rate of 30~45 kg/hr·cm$^2$ to obtain a parison. The thus obtained parison underwent a great degree of foaming wherein although cells were observed on the surface, no irregularity as would have been caused by melt fracture was found in the parison surface, thus being good in appearance.

Subsequently, the parison was set in a cylindrical mold which was located beneath the die and cooled with water, and after clamping, the parison was subjected to blow molding by blowing a pressurized gas (air) with a pressure of 1000 g/cm$^2$ into the parison from a gas blowing port attached to the mold at a lower portion thereof, thereby obtaining a blow-molded foam of good appearance composed of the foamed layer alone.

Example 7

In the same manner as in Example 6 except that butane used as a foaming agent was :forced into and kneaded with the resin on the way of the extruder having a bore diameter of 65 mm at a ratio of 0.55 moles per 1 kg of the base resin, there was obtained a parison. The thus obtained parison underwent a great degree of foaming, and parison surface was free of an irregularity ascribed to melt fracture and was thus good. A pressurized gas was blown into the parison for blow molding in the same manner as in Example 6 to obtain a blow-molded foam of good quality.

Examples 8 and 9

A mixture of 100 parts by weight of a base resin for foamed layer indicated in Table 1 and 3 parts by weight of a master batch of a cell controlling agent (i.e., a master batch comprising a base resin of low density polyethylene, 5 wt % of sodium stearate and 10 wt % of talc) was fed into an extruder having a bore diameter of 65 mm. Butane used as a foaming agent was forced into and kneaded with the resin on the way of the extruder at a ratio of 0.43 moles per 1 kg of the base resin to provide a foamable melt. Next, the melt temperature was adjusted to 163° C., and the melt was charged into an accumulator.

On the other hand, a base resin for inner layer and a base resin for outer layer, both indicated in Table 1, were formulated with a colorant, respectively, and were separately fed into two extruders each having a bore diameter of 40 mm, followed by melt-kneading to obtain non-foamable melts.

Subsequently, the temperature of the foamable melt was adjusted to 169° C., and the temperature of the non-foamable melts was adjusted to 190° C., followed by charge into accumulators connected to the respective extruders. The rams of the respective accumulators were pressed and, at the same time, the gate disposed at the die tip was opened to cause the melts to be discharged from the die at a discharge rate of 30–45 kg/hr cm$^2$, thereby obtaining a parison. At the time, the respective melts charged into the die from the accumulators were joined in the vicinity of the gate provided in the neighborhood of the die tip and discharged from the die in the form of layers to form a parison having a three-layered arrangement of inner layer/foamed layer/outer layer. The thus obtained parison had the foamed layer undergoing a great degree of foaming, with a good, smooth parison surface.

Subsequently, the parison was subjected to blow molding in the same manner as in Example 6 to obtain a blow-molded foam of good quality.

Example 10

In the same manner as in Example 8 except that butane used as a foaming agent wasp forced into and kneaded with the resin on the way of the extruder having a bore diameter of 65 mm at a ratio of 0.55 moles per 1 kg of the base resin. The resultant parison had a foamed layer having a great degree of foaming, with a good, smooth parison surface. The parison was subjected to blow molding in the same manner as in Example 6 to obtain a blow-molded foam of good quality.

Comparative Example 1

A mixture of 100 parts by weight of a base resin for foamed layer, indicated in Table 1 and 4 parts by weight of a master batch of a polyethylene-based decomposition-type foaming agent, in which 40 wt % of a sodium citrate decomposable foaming agent was formulated, was fed into an extruder having a bore diameter of 65 mm and melt-kneaded to provide a foamable melt. Thereafter, the temperature of the melt was adjusted to 163° C., and the melt was extruded from the die to obtain a parison. The thus obtained parison suffered breakage and shrinkage of cells immediately after the extrusion from the die, and thus hardly expanded. Moreover, fine splits were found on the surface of the parison owing to the breakage of the cells. A pressurized gas was blown into the parison for blow molding in the same manner as in Example 1, but a blow-molded foam of good quality could not be obtained.

Comparative Example 2

In the same manner as in Example 1 except that a base resin for foamed layer indicated in Table 1 was used, there was obtained a parison. The thus obtained parison suffered breakage and shrinkage of cells immediately after the extrusion from die, and thus hardly expanded. Moreover, fine splits were found at the parison surface owing to the breakage of cells. A pressurized gas was blown into the parison for blow molding in the same manner as in Example 1, but a blow-molded foam of good quality could not be obtained.

Comparative Example 3

In the same manner as in Comparative Example 1 except that a base resin for foamed layer indicated in Table 1 was used, there was obtained a single-layered foamed parison. Although the thus obtained parison had a foamed layer undergoing a great degree of foaming, pronounced irregularities were found on the surface with poor surface smoothness. A pressurized gas was blown into the parison for blow molding in the same manner as in Example 1, whereupon a thin portion of the parison was torn off, from which a blown pressurized gas was leaked, so that there could not be obtained any molded foam.

Comparative Example 4

In the same manner as in Example 3 except that a base resin for outer layer indicated in Table 1 was used, it was attempted to obtain a parison. However, the flow of the base resin for outer layer in the die was poor, and the base resin for outer layer was extruded in such a way that the resin was torn into pieces from the lip and was finally clogged inside the lip. Thus, any parison could not be obtained.

Comparative Example 5

In the same manner as in Example 3 except that a base resin for inner layer and a base resin for outer layer, both indicated in Table 1, were used, there was obtained a parison. The thus obtained parison had a foamed layer undergoing a great degree of foaming, but the surface irregularity was considerable, with poor surface smoothness. The parison was subjected to blow molding by blowing a pressurized gas into the parison in the same manner as in Example 1, whereupon it was found that the thin portion of the parison was torn off, from which the blown pressurized gas was leaked. Thus, there could not be obtained any molded foam.

Comparative Example 6

In the same manner as in Example 2 except that a base resin for inner layer and a base resin for outer layer, both indicated in Table 1, were used, there was obtained a parison. The thus obtained parison had a foamed layer undergoing a great degree of foaming, and no irregularity as would have been caused by melt fracture was observed in the parison surface. However, the outer layer had an irregularity in thickness and the foamed layer was sporadically exposed to. The parison was subjected to blow molding in the same manner as in Example 1 by blowing a pressurized gas thereinto, whereupon it was found that the thin portion of the outer layer of the parison was torn off, from which the blown pressurized gas was leaked. Thus, there could not be obtained any molded foam.

Comparative Example 7

It was attempted to obtain a parison in the same manner as in Example 1 except that 1,1,1-trifluoroethane (HFC-143a, SP value 5.7) was used as a foaming agent in an amount of 0.43 moles per 1 kg of the base resin, but the molten resin and the foaming agent were extruded from the die as separated, and thus, there could not be obtained any parison.

The butane foaming agent used in the examples and comparative examples was a mixed foaming agent containing 33 wt % of isobutane and 67 wt % of normal butane.

The types and properties of the base resins used in the examples and comparative examples are shown in Table 3.

TABLE 1

| | Resin forming foamed layer | | | Resin forming inner layer | | | Resin forming outer layer | | |
|---|---|---|---|---|---|---|---|---|---|
| | Type of base resin | MT (gf) | MFR (g/10 min) | Type of base resin | MT (gf) | MFR (g/10 min) | Type of base resin | MT (gf) | MFR (g/10 min) |
| Example | | | | | | | | | |
| 1 | A | 6 | 4.5 | — | — | — | — | — | — |
| 2 | A | 6 | 4.5 | A | 6 | 4.5 | A | 6 | 4.5 |
| 3 | A | 6 | 4.5 | C | 0.4 | 8 | C | 0.4 | 8 |
| 4 | A | 6 | 4.5 | C | 0.4 | 8 | B | 1 | 3 |
| 5 | A | 6 | 4.5 | — | — | — | A | 6 | 4.5 |
| 6 | A | 6 | 4.5 | — | — | — | — | — | — |
| 7 | A | 6 | 4.5 | — | — | — | — | — | — |
| 8 | A | 6 | 4.5 | A | 6 | 4.5 | A | 6 | 4.5 |
| 9 | A | 6 | 4.5 | A | 6 | 4.5 | E | 0.4 | 8 |
| 10 | A | 6 | 4.5 | A | 6 | — | A | 6 | 4.5 |
| Comparative Example | | | | | | | | | |
| 1 | B | 1 | 3 | — | — | — | — | — | — |
| 2 | B | 1 | 3 | — | — | — | — | — | — |
| 3 | A | ※ | ※ | — | — | — | — | — | — |
| 4 | A | ※ | ※ | C | ※ | ※ | D | ※ | ※ |
| 5 | A | ※ | ※ | A | ※ | ※ | A | ※ | ※ |
| 6 | A | ※ | ※ | C | ※ | ※ | C | ※ | ※ |
| 7 | A | ※ | ※ | — | — | — | — | — | — |

※Any molded foam could not be obtained and no measurement was made.

TABLE 2

| | Average cell diameter in foamed layer (mm) | Average thickness (mm) | | | Average density of foamed layer (g/cm³) | Residual amount of volatile foaming agent (wt %) |
|---|---|---|---|---|---|---|
| | | Inner layer | Foamed layer | Outer layer | | |
| Example | | | | | | |
| 1 | 1.5 | — | 3 | — | 0.21 | 2.0 |
| 2 | 0.9 | 0.3 | 9 | 0.3 | 0.15 | 2.2 |
| 3 | 0.1 | 0.4 | 6 | 0.4 | 0.22 | — |
| 4 | 0.1 | 0.4 | 7 | 0.4 | 0.23 | — |
| 5 | 1.0 | — | 8 | 0.2 | 0.15 | 2.1 |
| 6 | 1.5 | — | 5 | — | 0.17 | 2.0 |
| 7 | 1.5 | — | 8 | — | 0.12 | 2.9 |
| 8 | 0.9 | 0.4 | 6 | 0.4 | 0.23 | 2.2 |
| 9 | 0.9 | 0.2 | 6 | 0.3 | 0.21 | 2.1 |
| 10 | 1.0 | 0.5 | 11 | 0.8 | 0.19 | 3.0 |
| Comparative Example | | | | | | |
| 1 | 0.3 | — | 4 | — | 0.52 | — |
| 2 | 1.8 | — | 2 | — | 0.69 | 1.2 |
| 3 | ※ | — | ※ | — | ※ | — |
| 4 | ※ | ※ | ※ | ※ | ※ | — |
| 5 | ※ | ※ | ※ | ※ | ※ | — |
| 6 | ※ | ※ | ※ | ※ | ※ | ※ |
| 7 | ※ | — | ※ | — | ※ | ※ |

※Any molded foam could not be obtained and no measurement was made.

TABLE 3

| Type of Base Resin | MT (gf) | MFR (g, 10 minutes) |
|---|---|---|
| A Propylene resin SD 632, made by Montell Canada Inc. | 20 | 3 |
| B Propylene-based random copolymer FD231, made by Japan Polyolefins Co., Ltd. | 1 | 3 |
| C Propylene homopolymer J700GP, made by Idemitsu Petrochemical Co., Ltd. | 0.4 | 8 |
| D Propylene homopolymer E150GK, made by Idemitsu Petrochemical Co., Ltd. | 3 | 0.6 |
| E Propylene-based random copolymer ET2031, made by Japan Polyolefins Co., Ltd. | 0.4 | 8 |

INDUSTRIAL APPLICABILITY

The invention relates to the manufacture of a blow-molded foam by subjecting a base resin mainly composed of a polypropylene resin to foaming extrusion by means of an extruder to form a parison, adapting the parison as a mold and blow-molding the parison. The thus manufactured blow-molded foam is excellent in heat resistance, rigidity and the like and can be conveniently utilized as a duct, an automotive part, a container, an electric appliance member and the like.

What is claimed is:

1. A blow-molded foam of the type which consists of a hollow molded foam obtained by blow-molding a parison in a desired form, characterized in that it comprises a foamed layer made of a base resin which is mainly composed of a polypropylene resin, wherein the resin forming said foamed layer has, at 230° C., a melt tension (MT) of 5 gf or over and a melt flow rate (MFR) of 1 g/10 minutes or over, and the foamed layer has an average cell diameter from about 0.05 to about 2.2 mm, an average thickness of about 0.5 mm or over, and an average density of about 0.30 g/cm$^3$ or below.

2. A blow-molded foam according to claim 1, wherein an additional layer is formed on an inner and/or outer side of the foamed layer.

3. A blow-molded foam of the type which consists of a hollow molded foam obtained by blow-molding a multi-layered parison in a desired form, characterized in that said hollow molded foam includes a foamed layer which is formed of a base resin mainly composed of a polypropylene resin having an average density from about 0.03 to about 0.30 g/cm$^3$, an average thickness of about 0.5 mm or over, and an average cell diameter from about 0.05 to about 2.2 mm, and a resin layer which is provided as an inner and/or outer layer of said foamed layer and which is made of a foamed resin or a non-foamed resin mainly composed of a polypropylene resin having a density exceeding about 0.3 g/cm$^3$, wherein the resin forming said foamed layer has, at 230° C., a melt tension (MT) of 5 gf or over and a melt flow rate (MFR) of 1 g/10 minutes or over.

4. A blow-molded foam according to claim 1 or 3, wherein said foamed layer has an average thickness from about 5 to about 50 mm.

5. A blow-molded foam according to claim 1 or 3, wherein said foamed layer has an average density from about 0.03 to about 0.25 g/cm$^3$.

6. A blow-molded foam according to claim 3, wherein the resin layer made of a foamed resin or non-foamed resin having a density exceeding about 0.3 g/cm$^3$ has an average thickness from about 1 to about 7 mm.

7. A blow-molded foam according to claim 3, wherein the resin forming said resin layer made of a foamed resin or non-foamed resin having a density exceeding about 0.3 g/cm$^3$ is provided, at least, at the outer side of said foamed layer, and has, at 230° C., a melt tension (MT) of 5 gf or over and a melt flow rate (MFR) of 1 g/10 minutes or over.

8. A process for producing a blow-molded foam, characterized in that it comprises the steps of adding a foaming agent to a base resin, which is mainly composed of a polypropylene resin and has, at 230° C., a melt tension (MT) of 10 gf or over and a melt flow rate (MFR) of 1 g/10 minutes or over, melt-kneading the mixture in an extruder under high temperature and high pressure conditions to obtain a foamable melt, extruding the melt from a die to a low pressure zone to form a parison having a foamed layer, placing said parison in a softened condition in a mold, and blowing a pressurizing gas into said parison to obtain a hollow molded foam having the foamed layer, and wherein the foamed layer has an average cell diameter from about 0.05 to about 2.2 mm, an average thickness of about 0.5 mm or over and an average density of about 0.30 g/cm$^3$ or below.

* * * * *